Sept. 1, 1931.  C. E. HOPPES  1,821,182
COUPLING DEVICE
Filed Nov. 8, 1926

INVENTOR
Charles E. Hoppes
BY
ATTORNEYS

Patented Sept. 1, 1931

1,821,182

UNITED STATES PATENT OFFICE

CHARLES E. HOPPES, OF SPRINGFIELD, OHIO, ASSIGNOR TO THE EVERWEAR MANUFACTURING COMPANY, OF SPRINGFIELD, OHIO, A CORPORATION OF OHIO

COUPLING DEVICE

Application filed November 8, 1926. Serial No. 146,949.

My invention relates to coupling devices, it being particularly intended for joining together the ends of adjacent members, such for instance as the tubular frame members of play-ground apparatus, although it is equally applicable to the connection of other structures.

The object of my invention is to provide simple and effective devices for connecting together the adjacent ends of co-operating members of a nature which will not only permit the connection to be quickly and easily made but which will be effective in rigidly securing the members together.

Figure 1:
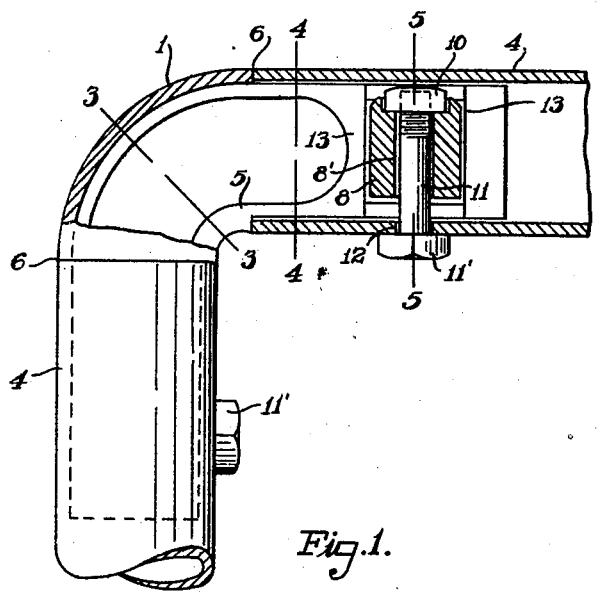
Fig. 1 is a view, partly in sections and partly in side elevation, showing my improved devices.
Figure 2:
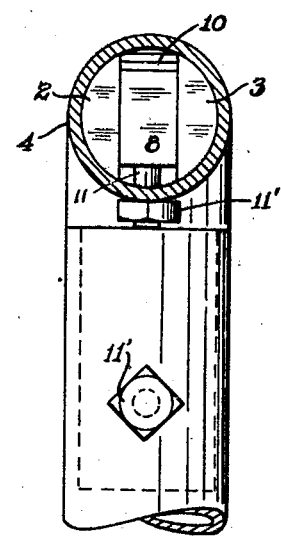
Fig. 2 is an end of the same.
Figure 5:
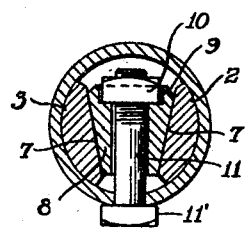
Fig. 5 is a section on the line 5—5 of Fig. 1.
Figure 3:
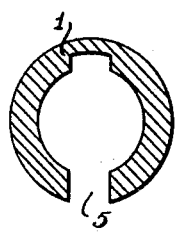
Fig. 3 is a section on the line 3—3 of Fig. 1.
Figure 4:
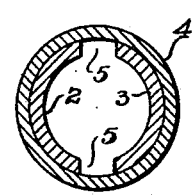
Fig. 4 is a section on the line 4—4 of Fig. 1.
Figure 6:
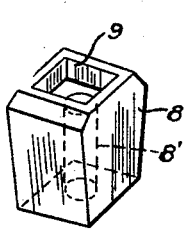
Fig. 6 is a perspective view of the wedge employed in my device.

Referring to the drawings, 1 represents a cast metal fitting, which in the present case is of the elbow type. This fitting is hollow and each end thereof has a pair of integrally spaced apart projecting shank members 2 and 3. The outer surface of each of these shank members in the present case is of a cylindrical character so as to receive one of the members to be connected, shown in the present case as a cylindrical tube 4. The wall of the hollow fitting is slotted as indicated at 5, this slot terminating in the spaces between the shank members. The shank members are somewhat less in diameter than the main body of the fitting so that shoulders 6 are formed at each end of the fitting to furnish abutments for the members 4 when they are slipped upon the shanks.

The shanks of each pair are provided with opposed inclined faces 7 to form a tapered pocket to receive a wedge-shaped block 8. One end of this block 8 is provided with a square recess 9 to receive a nut 10 and the block is also apertured from end to end, as indicated at 8', to receive a bolt 11, the threaded end of which is received in the nut 10 and the head 11' of which engages the outer wall of the frame member 4 when the bolt is turned, the frame member 4 being provided with an aperture 12 through which the bolt is inserted. The wedge 8 is not only confined between the beveled walls 7 on two of its sides, but also by walls 13 formed on the shanks.

In operation, after one of the frame members 4 has been slipped upon its corresponding shanks, with the wedge and nut in position in the pocket formed by the inclined faces of the shanks, the bolt 11 is inserted through the aperture 12 and threaded into the nut 10 until the head 11' contacts the outer wall of the frame member, after which further turning of the bolt by means of a suitable tool applied to its head acts through the nut, which is prevented from turning by the square recess 9, to draw the wedge between the inclined surfaces 7 of the shanks and thereby spring the shanks outwardly and cause them to impinge tightly against the inner wall of the frame member; the inherent resiliency of the metal forming the fitting and its shanks, in connection with the slot 5, permitting the necessary spring to the shanks.

Having thus described my invention, I claim:

1. In a coupling device of the character described, a tubular member to be coupled, a fitting having spaced-apart integral shanks for insertion in the end of said tubular member, the interior walls of said shanks having oppositely inclined surfaces to form a converged transversely extending pocket, a wedge located in said pocket, said wedge having an aperture which extends at right angles to the length of said tubular member and the wall of said tubular member also having an aperture in line with the aperture of said wedge, a bolt projecting through said apertures, and a nut for the inner end of said bolt interengaged with said wedge to prevent the nut from turning to permit the bolt to be screwed therein.

2. In a coupling device of the character described, a tubular member to be coupled, a fitting having spaced-apart integral shanks for insertion in the end of said tubular member, the interior walls of said shanks being inclined to form a tapered transversely-extending pocket, a wedge located in said pocket, said wedge having an aperture which extends at right angles to the length of said tubular member and the wall of said tubular member also having an aperture in line with the aperture of said wedge, a bolt projecting through said aperture with its head on the outside of said tubular member, said wedge being provided at one end of its aperture with a recess, and a nut for said bolt seated in said recess and interengaged with the walls thereof to prevent the nut from turning.

3. In a coupling of the character described, a tubular member to be coupled, a fitting provided with a pair of spaced-apart integral shanks for insertion in the end of said tubular member, the interior walls of said shanks being inclined to form a transversely-extending tapered pocket, a transversely-arranged wedge in said pocket, said wedge being insertable within said pocket prior to the insertion of said shanks in said tubular member to permit the wedge to lie wholly within said tubular member, and means connected with said wedge and extending through the wall of said tubular member for drawing said wedge between said shanks to spread said shanks against the wall of said tubular member.

4. In a coupling of the character described, a tubular member to be coupled, a fitting provided with a pair of integral spaced-apart shanks for insertion in the end of said tubular member, the body of said fitting being formed with a slot terminating in the space between said shanks, a wedge insertable between said shanks prior to the insertion of the shanks in said tubular member to permit the wedge to lie wholly within said tubular member, and means operable from the exterior of said tubular member for actuating the wedge and thus forcing the shanks against the interior wall of said tubular member to clamp the same to the shanks.

In testimony whereof, I have hereunto set my hand this 12th day of April, 1926.

CHARLES E. HOPPES.